US007103478B2

(12) United States Patent
Sawamoto

(10) Patent No.: US 7,103,478 B2
(45) Date of Patent: Sep. 5, 2006

(54) VEHICULAR CONTROL OBJECT DETERMINATION SYSTEM

(75) Inventor: Kiichiro Sawamoto, Saitama (JP)

(73) Assignee: Honda Motor Co., Ltd., (JP)

( * ) Notice: Subject to any disclaimer, the term of this patent is extended or adjusted under 35 U.S.C. 154(b) by 0 days.

(21) Appl. No.: 11/256,316

(22) Filed: Oct. 21, 2005

(65) Prior Publication Data

US 2006/0136132 A1 Jun. 22, 2006

(30) Foreign Application Priority Data

Nov. 4, 2004 (JP) ............................. 2004-320432

(51) Int. Cl.
*G06F 19/00* (2006.01)
(52) U.S. Cl. ........................ 701/301; 701/96; 340/435; 340/436; 342/455
(58) Field of Classification Search .................. 701/93, 701/96, 301; 342/455; 340/435, 436, 903; 180/170, 179
See application file for complete search history.

(56) References Cited

U.S. PATENT DOCUMENTS

| 5,806,019 | A * | 9/1998 | Ishiyama .................... 701/300 |
| 6,684,149 | B1 * | 1/2004 | Nakamura et al. ............ 701/96 |
| 2003/0045991 | A1 * | 3/2003 | Isogai et al. ................... 701/96 |
| 2004/0117090 | A1 * | 6/2004 | Samukawa et al. ........... 701/45 |
| 2005/0090950 | A1 * | 4/2005 | Sawamoto et al. ............ 701/23 |
| 2005/0102089 | A1 * | 5/2005 | Linden ......................... 701/96 |
| 2005/0209762 | A1 * | 9/2005 | Lu et al. ........................ 701/70 |
| 2005/0216171 | A1 * | 9/2005 | Heinrichs-Bartscher ...... 701/96 |
| 2006/0089802 | A1 * | 4/2006 | Sawamoto .................. 701/301 |

FOREIGN PATENT DOCUMENTS

| JP | 10-105891 | 4/1998 |
| JP | 2000-38121 | 2/2000 |

* cited by examiner

*Primary Examiner*—Gary Chin
(74) *Attorney, Agent, or Firm*—O'Melveny & Myers LLP

(57) ABSTRACT

Whether or not a radar device detects an object is determined by a detection state determinator. Whether or not a time during which the object is not detected and which is measured by a clocking device becomes a determination threshold value or more, is determined by a non-detection determinator. Based on the determination results, an informing device informs an occupant that the object is not detected for a predetermined time or more. Therefore, a state in which the radar device does not detect an object due to absence of the object on a road in a desert or the like is prevented from being erroneously determined as a state caused by contamination of the radar device. Also, the occupant can easily determine whether the operation of the informing device is actually caused by absence of an object or contamination of the radar device, based on the environment around the road on which the own vehicle is traveling. Especially because a reflected wave from a road surface, of which intensity changes in accordance with the condition, is not used for determination, it becomes unnecessary to change the setting of the determination threshold value and determination frequency region, and thus the structure and operation are simplified.

21 Claims, 7 Drawing Sheets

VEHICULAR CONTROL OBJECT DETERMINATION SYSTEM

RELATED APPLICATION DATA

The present application claims priority to Japanese priority application No. 2004-320432 filed Nov. 4, 2004, which is hereby incorporated in its entirety herein by reference.

BACKGROUND OF THE INVENTION

1. Field of the Invention

The present invention relates to a vehicular control object determination system that includes an object detector for detecting an object that is present in the direction of travel of a vehicle, a travel locus estimator for estimating a future travel locus of the vehicle, a certainty calculator for calculating, based on a detection result obtained by the object detector, a travel locus estimated by the travel locus estimator, and predetermined certainty calculation conditions, a certainty with which the object becomes a control object, and a control object determiner for determining, according to a cumulative value of the certainty, an object as a control object for a subject vehicle.

2. Description of the Related Art

Japanese Patent Application Laid-open No. 10-105891 discloses an arrangement in which a sideways movement speed at which another vehicle detected by a radar device moves in front of a subject vehicle is compared with a threshold value that varies according to an inter-vehicle distance between the subject vehicle and this other vehicle, and when the sideways movement speed exceeds the threshold value it is determined that there is a possibility that the other vehicle might enter a lane in which the subject vehicle is present and collide with the subject vehicle.

There is also an arrangement known from Japanese Patent Application Laid-open No. 2000-38121 in which, when carrying out tracking control with respect to a preceding vehicle, the confidence in the preceding vehicle is calculated based on an inter-vehicle distance between a subject vehicle and the preceding vehicle and the sideways position of the preceding vehicle relative to the subject vehicle, and the content of the tracking control is modified according to this confidence.

However, in the arrangement described in Japanese Patent Application Laid-open No. 10-105891, since the possibility of collision with an object is determined based on the sideways movement speed of the object and the distance to the object, there is a possibility that another vehicle that has a relative speed in a direction moving forward and away from the subject vehicle and has no possibility of collision might be erroneously determined to have a possibility of collision.

Furthermore, in the arrangement described in Japanese Patent Application Laid-open No. 2000-38121, since it is determined whether or not the preceding vehicle becomes a control object for tracking control based on the inter-vehicle distance between the subject vehicle and the preceding vehicle and the sideways position of the preceding vehicle relative to the subject vehicle, there is a possibility that a vehicle that moves away from the front of the subject vehicle in a sideways direction might erroneously be determined as a control object.

SUMMARY OF THE INVENTION

The present invention has been accomplished under the above-mentioned circumstances, and it is an object thereof to enable another vehicle that enters the lane of a subject vehicle from an adjacent lane to be determined appropriately as a control object.

In order to achieve the first object, according to a first feature of the present invention, there is provided a vehicular control object determination system comprising: an object detector for detecting an object that is present in the direction of travel of a vehicle; a travel locus estimator for estimating a future travel locus of the vehicle; a certainty calculator for calculating, based on a detection result obtained by the object detector, a travel locus estimated by the travel locus estimator, and predetermined certainty calculation conditions, a certainty with which an object becomes a control object; a control object determiner for determining an object, as a control object for a subject vehicle, according to a cumulative value of the certainty; a sideways relative speed detector for detecting a sideways relative speed at which the object detected by the object detector approaches the travel locus of the subject vehicle; and a direction-of-travel relative speed detector for detecting a direction-of-travel relative speed at which the object approaches the subject vehicle; the certainty calculator modifying the certainty calculation conditions based on the sideways relative speed and the direction-of-travel relative speed.

With the first feature of the present invention, the sideways relative speed at which the object approaches the travel locus of the subject vehicle is detected by the sideways relative speed detector, the direction-of-travel relative speed at which the object approaches the subject vehicle is detected by the direction-of-travel relative speed detector, and the certainty calculator modifies the certainty calculation conditions based on the sideways relative speed and the direction-of-travel relative speed. Therefore, when another vehicle in an adjacent lane attempts to cut into the lane of the subject vehicle and the sideways relative speed and the direction-of-travel relative speed change, by changing the certainty so as to make the control object determiner easily recognize this other vehicle as a candidate for the control object, the accuracy with which another vehicle that attempts to cut into the lane of the subject vehicle is determined as the control object can be enhanced.

According to a second feature of the present invention, there is provided a vehicular control object determination system comprising: an object detector for detecting an object that is present in the direction of travel of a vehicle; a travel locus estimator for estimating a future travel locus of the vehicle; a certainty calculator for calculating, based on a detection result obtained by the object detector, a travel locus estimated by the travel locus estimator, and predetermined certainty calculation conditions, a certainty with which the object becomes a control object; a control object determiner for determining an object, as a control object for a subject vehicle, according to a cumulative value of the certainty; a sideways relative speed detector for detecting a sideways relative speed at which the object detected by the object detector approaches the travel locus of the subject vehicle; and a deceleration intention detector for detecting a driver's deceleration intention; the certainty calculator modifying the certainty calculation conditions based on the sideways relative speed and the deceleration intention.

With the second feature of the present invention, the sideways relative speed at which the object approaches the travel locus of the subject vehicle is detected by the sideways relative speed detector, the driver's deceleration intention is detected by the deceleration intention detector, and the certainty calculator modifies the certainty calculation conditions based on the sideways relative speed and the deceleration intention. Therefore, when the sideways relative speed changes due to another vehicle in an adjacent lane attempting to cut into the lane of the subject vehicle, and the driver decelerates the subject vehicle in order to avoid approaching this other vehicle, by changing the certainty so as to make the control object determiner easily recognize the other vehicle as a candidate for the control object, the accuracy with which another vehicle that attempts to cut into the lane of the subject vehicle is determined as the control object can be enhanced.

According to a third feature of the present invention, in addition to the first or second feature, the certainty calculator modifies the certainty calculation conditions so as to increase the certainty when the sideways relative speed detected by the sideways relative speed detector is equal to or greater than a predetermined value.

With the third feature of the present invention, since the certainty is modified so as to be high when the sideways relative speed is equal to or greater than the predetermined value, when another vehicle attempts to cut into the lane of the subject vehicle, this other vehicle can be reliably recognized as a candidate for the control object.

According to a fourth feature of the present invention, in addition to the first feature, the certainty calculator modifies the certainty calculation conditions so as to increase the certainty when the direction-of-travel relative speed detected by the direction-of-travel relative speed detector is equal to or greater than a predetermined value.

With the fourth feature of the present invention, since the certainty is modified so as to be high when the direction-of-travel relative speed is equal to or greater than the predetermined value, when the subject vehicle approaches another vehicle that attempts to cut into the lane of the subject vehicle, this other vehicle can be reliably recognized as a candidate for the control object.

According to a fifth feature of the present invention, in addition to the second feature, the certainty calculator modifies the certainty calculation conditions so as to increase the certainty when the magnitude of the deceleration intention detected by the deceleration intention detector is equal to or greater than a predetermined value.

With the fifth feature of the present invention, since the certainty is modified so as to be high when the magnitude of the deceleration intention is equal to or greater than the predetermined value, when the driver decelerates the subject vehicle so as not to approach another vehicle that attempts to cut into the lane of the subject vehicle, this other vehicle can be reliably recognized as a candidate for the control object.

According to a sixth feature of the present invention, in addition to any one of the first to fifth features, the travel locus estimator sets a control object determination region having a predetermined width with respect to the estimated travel locus and modifies the width of the control object determination region according to the magnitude of at least one of the sideways relative speed, the direction-of-travel relative speed, and the deceleration intention, and wherein the certainty calculator calculates a certainty of an object that is present within the control object determination region.

With the sixth feature of the present invention, when the travel locus estimator sets the control object determination region having a predetermined width relative to the travel locus, the width of the control object determination region is modified according to the sideways relative speed, the direction-of-travel relative speed, or the magnitude of the deceleration intention, and the certainty calculator calculates the certainty of an object within the control object determination region. Therefore, it is possible to set an appropriate range for an object for which the certainty is calculated.

According to a seventh feature of the present invention, in addition to the sixth feature, the travel locus estimator enlarges the width of the control object determination region in response to an increase in at least one of the sideways relative speed, the direction-of-travel relative speed, and the deceleration intention.

With the seventh feature of the present invention, since the width of the control object determination region is enlarged in response to an increase in the sideways relative speed, the direction-of-travel relative speed, or the deceleration intention, another vehicle that has a possibility of cutting into the lane of the subject vehicle can be reliably recognized as a candidate for the control object.

According to an eighth feature of the present invention, in addition to any one of the first to seventh features, the certainty calculator calculates a sideways distance between an object and the travel locus estimated by the travel locus estimator, and calculates a certainty by subtracting from a predetermined initial value a value obtained by multiplying the sideways distance by a proportionality constant.

With the eighth feature of the present invention, the certainty is calculated by calculating a sideways distance between an object and the travel locus of the subject vehicle and subtracting, from the predetermined initial value on the travel locus, the value obtained by multiplying the sideways distance by the proportionality constant. Therefore, the certainty can be gradually lowered in going away in the sideways direction from the travel locus of the subject vehicle.

According to a ninth feature of the present invention, in addition to the eighth feature, the certainty calculator decreases the proportionality constant in response to an increase in at least one of the sideways relative speed, the direction-of-travel relative speed, and the deceleration intention.

With the ninth feature of the present invention, since the proportionality constant decreases in response to an increase in the sideways relative speed, the direction-of-travel relative speed, or the deceleration intention, the certainty at a position separated from the travel locus in the sideways direction can be increased so as to be closer to the initial value on the travel locus without changing the initial value of the certainty on the travel locus.

According to a tenth feature of the present invention, in addition to the eighth or ninth feature, the certainty calculator increases the certainty evenly over the whole region in the width direction of the control object determination region in response to an increase in at least one of the sideways relative speed, the direction-of-travel relative speed, and the deceleration intention.

With the tenth feature of the present invention, when the sideways relative speed, the direction-of-travel relative speed, or the deceleration intention increases, the certainty can be increased evenly over the whole region in the width direction of the control object determination region.

According to an eleventh feature of the present invention, in addition to any one of the first to tenth features, the certainty calculator carries out a map lookup for a certainty based on at least one of the sideways relative speed, the direction-of-travel relative speed, and the deceleration intention.

With the eleventh feature of the present invention, since the certainty is looked up in a map on the basis of the sideways relative speed, the direction-of-travel relative speed, or the deceleration intention, the computational burden can be lightened compared with a case in which the certainty is calculated each time.

The above-mentioned object, other objects, characteristics, and advantages of the present invention will become apparent from an explanation of preferred embodiments that will be described in detail below by reference to the attached drawings.

BRIEF DESCRIPTION OF THE DRAWINGS

FIG. 1 is a block diagram of a control system for an ACC system,

FIG. 2 is a flowchart for explaining the operation,

FIG. 3 is a diagram for explaining a method for estimating a future travel locus of a subject vehicle, FIG. 4 is a graph showing one example of how certainty varies according to sideways relative speed, direction-of-travel relative speed, and sideways position within a lane, and FIG. 5 is a graph showing another example of how certainty varies according to sideways relative speed, direction-of-travel relative speed, and sideways position within a lane.

DESCRIPTION OF PREFERRED EMBODIMENTS

Figure 1:
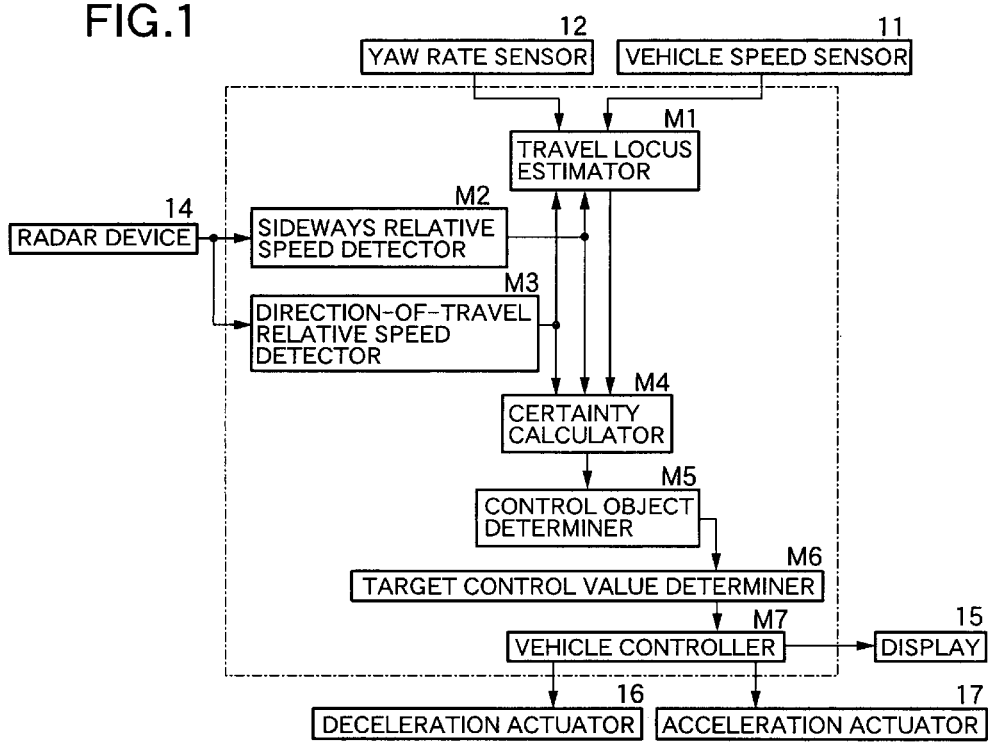
FIG. 1 to FIG. 5 show a first embodiment of the present invention.

As shown in FIG. 1, an ACC (Adaptive Cruise Control) system, which maintains a preset inter-vehicle distance when there is a preceding vehicle, thus tracking the preceding vehicle, and maintains a preset vehicle speed when there is no preceding vehicle, thus keeping the speed constant, includes travel locus estimator M1, sideways relative speed detector M2, direction-of-travel relative speed detector M3, certainty calculator M4, control object determiner M5, control target value determiner M6, and vehicle controller M7.

Connected to the travel locus estimator M1 are a vehicle speed sensor 11 and a yaw rate sensor 12. Connected to the sideways relative speed detector M2 and the direction-of-travel relative speed detector M3 is a radar device 14. Connected to the vehicle controller M7 are a display 15, a deceleration actuator 16, and an acceleration actuator 17.

Figure 3:
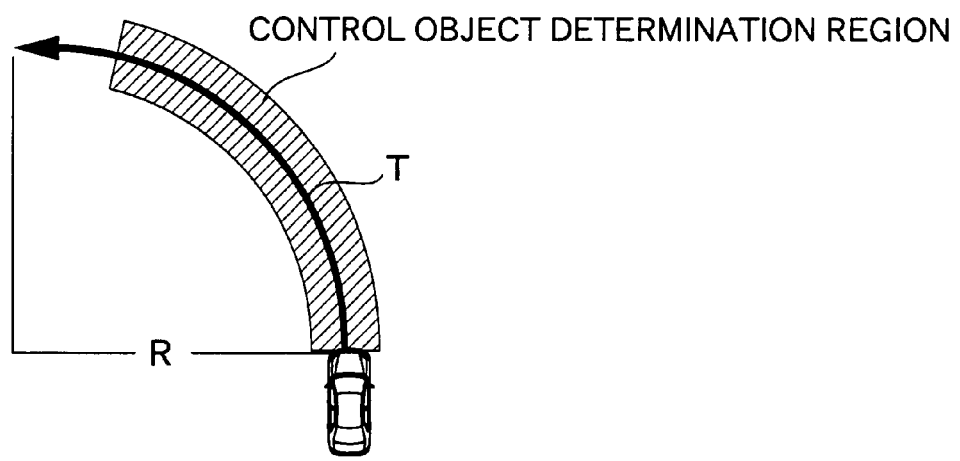

As shown in FIG. 3, the travel locus estimator M1 estimates a future travel locus T of a subject vehicle based on a vehicle speed detected by the vehicle speed sensor 11 and a yaw rate detected by the yaw rate sensor 12. That is, since a turning radius R of the vehicle can be calculated from a present vehicle speed and yaw rate, the future travel locus T of the subject vehicle can be estimated by joining an arc having the turning radius R to a present direction of travel of the subject vehicle. Furthermore, the travel locus estimator M1 sets a band-shaped control object determination region having a predetermined width on the estimated travel locus.

The sideways relative speed detection means M2 compares the previous position and the current position of a preceding vehicle detected by the radar device 14, and detects a sideways relative speed of the preceding vehicle from the rate of change with respect to time of the distance between the subject vehicle and the preceding vehicle in a direction perpendicular to the direction of travel of the subject vehicle. Similarly, the direction-of-travel relative speed detector M3 compares the previous position and the current position of the preceding vehicle detected by the radar device 14, and detects a direction-of-travel relative speed of the preceding vehicle from the rate of change with respect to time of the inter-vehicle distance between the subject vehicle and the preceding vehicle.

The certainty calculator M4 carries out a map lookup for the certainty with which the preceding vehicle is determined as a control object, from the sideways relative speed detected by the sideways relative speed detector M2 and the direction-of-travel relative speed detected by the direction-of-travel relative speed detector M3. By carrying out a map lookup in this way, the computational burden can be lightened compared with a case in which the certainty is calculated each time.

The control object determiner M5 determines whether or not a preceding vehicle included in the band-shaped control object determination region set by the travel locus estimator M1 can become a control object. The determination reference used here is a cumulative value of the certainty calculated at predetermined time intervals; a preceding vehicle that has a cumulative value exceeding a threshold value is determined as a candidate for the control object, when there are a plurality of control object candidates, the preceding vehicle that is the closest to the subject vehicle is determined as the control object, and when there is only one control object candidate, this preceding vehicle is determined as the control object.

The control target value determiner M6 determines a target vehicle speed, a target acceleration/deceleration, a target inter-vehicle distance, etc., which are parameters used for making the subject vehicle track the preceding vehicle that is the control object. The vehicle controller M7 operates the deceleration actuator 16 or the acceleration actuator 17 based on a control target value determined by the control target value determiner M6 so as to make a throttle valve open and close or operate a brake system, thus carrying out tracking control or constant speed travel control, and displays a present control state of the vehicle on the display 15 so as to inform a driver.

Figure 2:
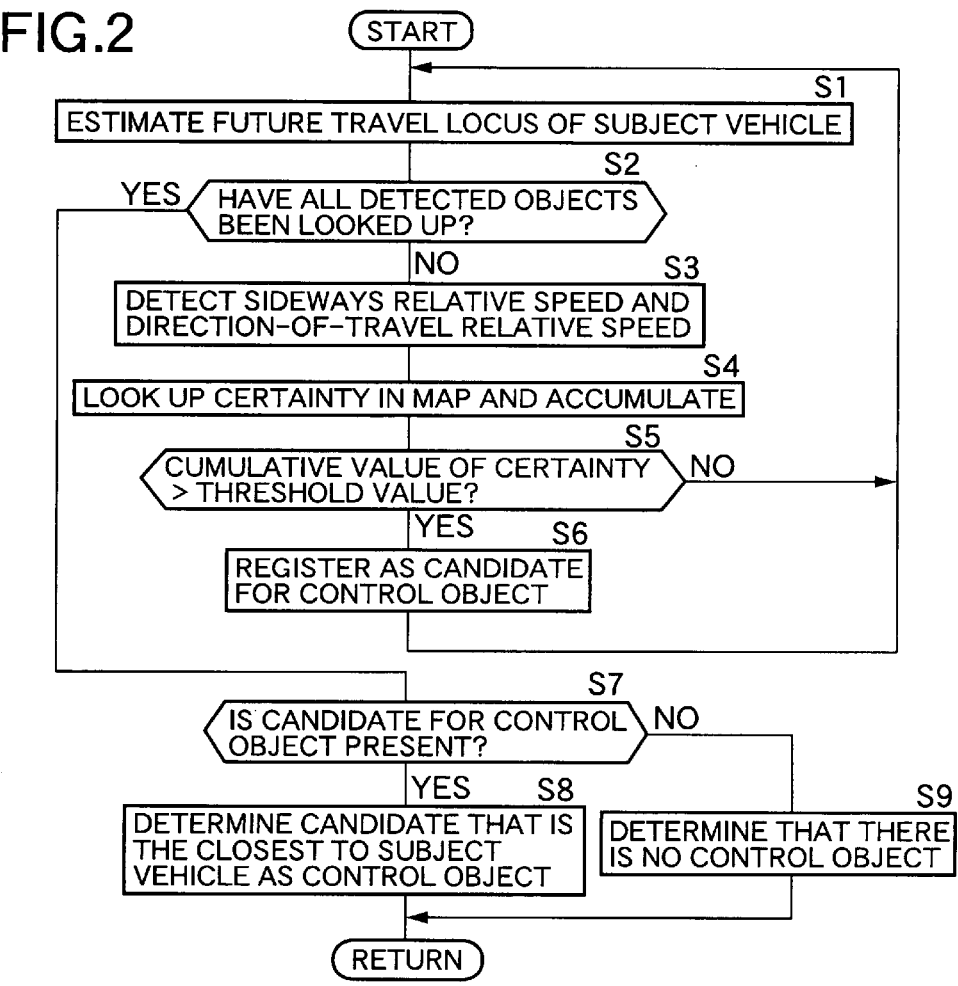

Operation of the first embodiment is now explained by reference to the flowchart of FIG. 2.

Firstly in step S1 the travel locus estimator M1 estimates the future travel locus of the subject vehicle based on the yaw rate and the vehicle speed and sets a control object determination region on the travel locus. In the subsequent step S2, the processes of steps S1 to S6 are repeated for all detected objects included in the control object determination region. That is, in step S3 a sideways relative speed and a direction-of-travel relative speed of the detected object are detected, and in step S4 a certainty is looked up in a map at predetermined time intervals using the sideways relative speed and the direction-of-travel relative speed as parameters, and the certainty is accumulated at predetermined time intervals.

TABLE 1

| A | B | | | |
|---|---|---|---|---|
| | −40 km/h > B | −40 km/h ≤ B <−20 km/h | −20 km/h ≤ B <0 km/h | 0 km/h ≤ B |
| −10 km/h > A | L3 | L2 | L1 | L0 |
| −10 km/h ≤ A <−5 km/h | L2 | L2 | L1 | L0 |
| −5 km/h ≤ A <0 km/h | L1 | L1 | L1 | L0 |
| 0 km/h ≤ A | L0 | L0 | L0 | L0 |

A: sideways relative speed (a direction approaching the travel locus is negative)
B: direction-of-travel relative speed (a direction approaching the subject vehicle is negative)

Table 1 shows a first map in which the certainty is looked up, column A denotes the sideways relative speed (a direction approaching the travel locus of the subject vehicle), and row B denotes the direction-of-travel relative speed (a direction approaching the subject vehicle is a negative value). L0 to L3 in Table 1 denote lines of certainty in the graph of FIG. 4; the certainty of each line L0 to L3 is a maximum when the detected object is positioned on the future travel locus of the subject vehicle (that is, in the middle in the right-and-left direction of the control object determination region), and gradually decreases therefrom toward left and right ends of the control object determination region. The inclinations of the lines L0 to L3, corresponding to the degree of gradual decrease, reduce relative to the reference line L0 in the order L1→L2→L3. The above-mentioned characteristics of each line L0 to L3 can be determined by calculating a sideways distance between the detected object and the future travel locus of the subject vehicle and subtracting, from an initial value a of the certainty corresponding to the vertex of each line L0 to L3, a value obtained by multiplying the sideways distance by a corresponding proportionality constant.

In going from lower right to upper left in Table 1, that is, as the absolute value of the sideways relative speed A increases and the absolute value of the direction-of-travel relative speed B increases, the line to be selected changes from L0 to L3. Since the inclinations of lines L0 to L3 decrease in this order, the certainty at the left and right-hand ends of the control object determination region approach the initial value a. That is, since the proportionality constant decreases when the sideways relative speed A or the direction-of-travel relative speed B increases, for line L0 the difference in certainty between the center of the control object determination region and opposite ends becomes the largest, and for line L3 the difference in certainty between the center of the control object determination region and opposite ends becomes the smallest. Therefore, the greater the speed at which the detected object approaches the travel locus and the greater the speed at which the subject vehicle approaches the detected object, the higher the certainty with which the detected object is determined as the control object.

TABLE 2

| A | B | | | |
|---|---|---|---|---|
| | −40 km/h > B | −40 km/h ≤ B <−20 km/h | −20 km/h ≤ B <0 km/h | 0 km/h ≤ B |
| −10 km/h > A | C3 | C2 | C1 | C0 |
| −10 km/h ≤ A <−5 km/h | C2 | C2 | C1 | C0 |
| −5 km/h ≤ A <0 km/h | C1 | C1 | C1 | C0 |
| 0 km/h ≤ A | C0 | C0 | C0 | C0 |

A: sideways relative speed (a direction approaching the travel locus is negative)
B: direction-of-travel relative speed (a direction approaching the subject vehicle is negative)

Table 2 shows a second map in which the certainty is looked up; column A denotes the sideways relative speed (a direction approaching the travel locus of the subject vehicle), and row B denotes the direction-of-travel relative speed (a direction approaching the subject vehicle is a negative value). C0 to C3 in Table 2 denote lines of certainty in the graph of FIG. 5; the certainty of each line C0 to C3 is a maximum when the detected object is positioned on the future travel locus of the subject vehicle (that is, in the middle in the right-and-left direction of the control object determination region), and gradually decreases therefrom toward left and right ends of the control object determination region in the same proportions. The degree of certainty increases from the reference line C0 in the order C1→C2→C3.

In going from lower right to upper left in Table 2, that is, as the absolute value of the sideways relative speed A increases and the absolute value of the direction-of-travel relative speed B increases, the line to be selected changes upward from C0 to C3, and as a result the certainty increases in the whole region in the right-and-left direction of the control object determination region. Therefore, the greater the speed at which the detected object approaches the travel locus and the greater the speed at which the subject vehicle approaches the detected object, the higher the certainty with which the detected object is determined as the control object.

Either one of the map of Table 1 or the map of Table 2 may be used, or both the map of Table 1 and the map of Table 2 may be used simultaneously. In the latter case, the greater the speed at which the detected object approaches the travel locus and the greater the speed at which the subject vehicle approaches the detected object, the greater the certainty, due to the angle of inclination of the line reducing and the position of the line moving upward.

When, in the subsequent step S5, the cumulative value of the certainty exceeds a predetermined threshold value, in step S6 the detected object is registered as a candidate for the control object. When in step S2 lookup of all of the detected objects included in the control object determination region is complete, if in step S7 there are a plurality of candidates registered for the control object, in step S8 the candidate for the control object that is the closest to the subject vehicle is determined as the control object. When there is only one candidate registered for the control object, this candidate is determined as the control object. Furthermore, if no candidate is registered for the control object in step S7, in step S9 it is determined that no control object exists.

As hereinbefore described, by monitoring the sideways relative speed A and the direction-of-travel relative speed B of the detected object, it is possible to reliably determine as a control object a preceding vehicle that cuts in in front of the subject vehicle without erroneously identifying as the control object a vehicle in an adjacent lane that travels at a position close to the subject vehicle or a large wide vehicle that travels in an adjacent lane, thereby appropriately carrying out inter-vehicle distance control, etc. with respect to the control object.

Figure 6:
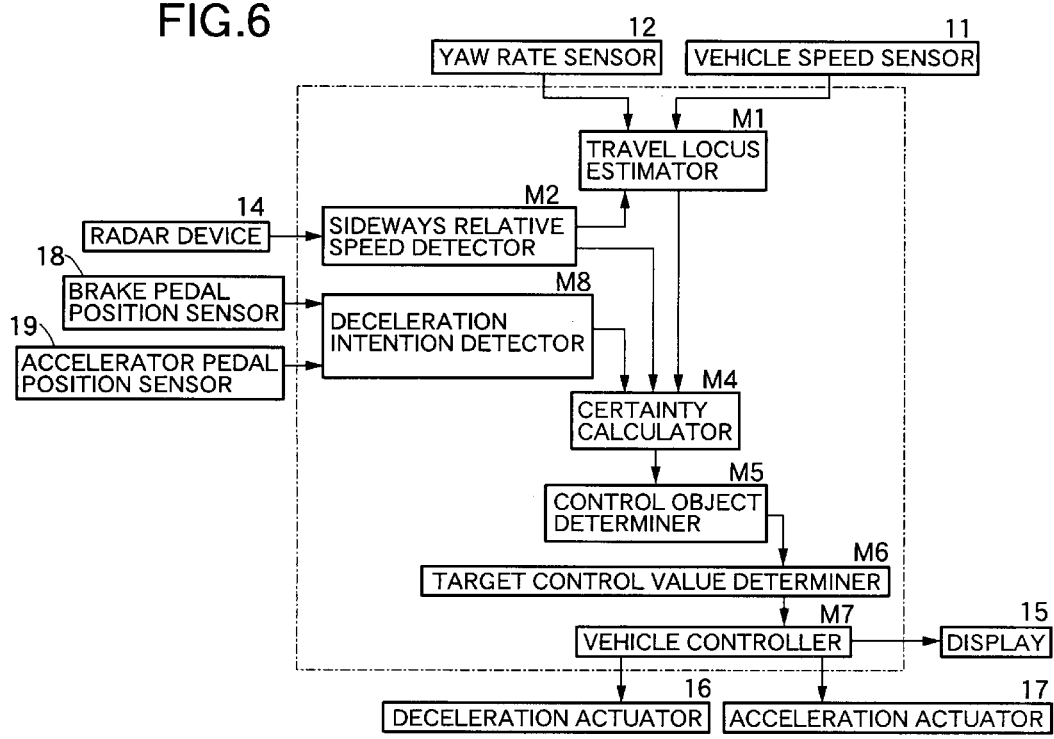
FIG. 6 is a block diagram of a control system for an ACC system related to a second embodiment.

A second embodiment of the present invention is now explained by reference to FIG. 6.

The second embodiment does not include the direction-of-travel relative speed detector M3 of the first embodiment but, instead, includes deceleration intention detector M8. Connected to the deceleration intention detector M8 are a brake pedal position sensor 18 and an accelerator pedal position sensor 19. The deceleration intention detector M8 detects a driver's deceleration intention from an operation to return an accelerator pedal, an operation to step on a brake pedal, or both thereof. The driver's deceleration intention is inputted into certainty calculator M4, and used there, together with a sideways relative speed, as a parameter for looking up a certainty in a map.

TABLE 3

| | P | | | |
|---|---|---|---|---|
| A | Large deceleration intention | Medium deceleration intention | Small deceleration intention | No deceleration intention |
| −10 km/h > A | L3 | L2 | L1 | L0 |
| −10 km/h ≦ A <−5 km/h | L2 | L2 | L1 | L0 |
| −5 km/h ≦ A <0 km/h | L1 | L1 | L1 | L0 |
| 0 km/h ≦ A | L0 | L0 | L0 | L0 |

A: sideways relative speed (a direction approaching the travel locus is negative)
P: driver's deceleration intention

TABLE 4

| | P | | | |
|---|---|---|---|---|
| A | Large deceleration intention | Medium deceleration intention | Small deceleration intention | No deceleration intention |
| −10 km/h > A | C3 | C2 | C1 | C0 |
| −10 km/h ≦ A <−5 km/h | C2 | C2 | C1 | C0 |
| −5 km/h ≦ A <0 km/h | C1 | C1 | C1 | C0 |
| 0 km/h ≦ A | C0 | C0 | C0 | C0 |

Figure 4:
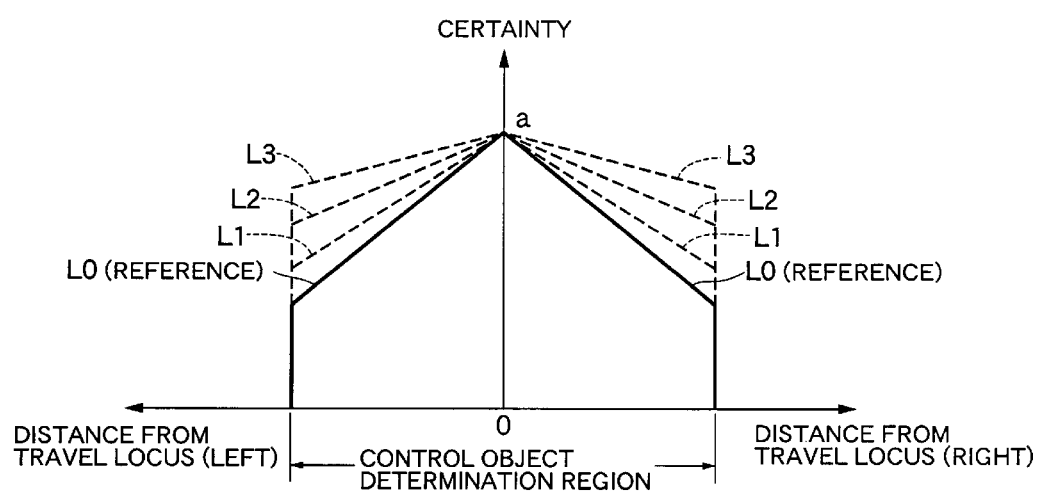

A: sideways relative speed (a direction approaching the travel locus is negative)
P: driver's deceleration intention Lines L0 to L3, which are looked up in Table 3 using as parameters the sideways relative speed A and the deceleration intention P, correspond to the lines L0 to L3 of FIG. 4. That is, the larger the driver's deceleration intention P, the higher the certainty is set, and by so doing, when a driver operates a brake in order to maintain an inter-vehicle distance from a vehicle that cuts into the lane of the subject vehicle from an adjacent lane, the cutting-in vehicle is determined as a new control object.

Figure 5:
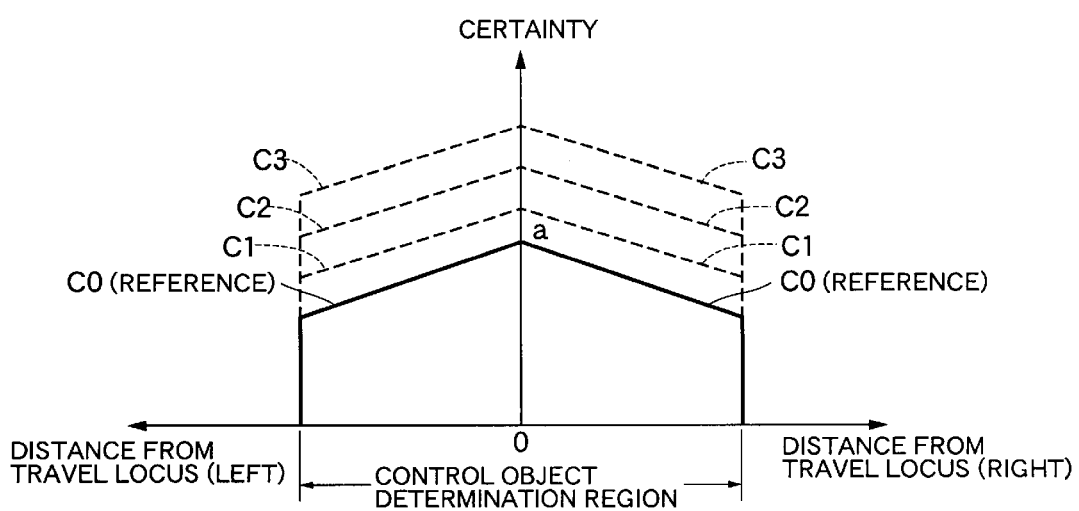

Lines C0 to C3, which are looked up in Table 4 using as parameters the sideways relative speed A and the deceleration intention P, correspond to the lines C0 to C3 of FIG. 5. In this case also, the larger the driver's deceleration intention P, the higher the certainty is set, and by so doing, when a driver operates a brake in order to maintain an inter-vehicle distance from a vehicle that cuts into the lane of the subject vehicle from an adjacent lane, the cutting-in vehicle is determined as a new control object.

In accordance with this second embodiment also, by monitoring the sideways relative speed A of the detected object and the driver's deceleration intention P, it is possible to reliably determine as a control object a preceding vehicle that cuts in in front of the subject vehicle without erroneously identifying as the control object a vehicle in an adjacent lane that travels at a position close to the subject vehicle or a large wide vehicle that travels in an adjacent lane, thereby appropriately carrying out inter-vehicle distance control, etc. with respect to the control object.

Furthermore, in the second embodiment, either one of the map of Table 3 or the map of Table 4 may be used, or both the map of Table 3 and the map of Table 4 may be used simultaneously. In the latter case, the greater the speed at which the detected object approaches the travel locus and the greater the driver's deceleration intention, the greater the certainty, due to the angle of inclination of the line reducing and the position of the line moving upward.

Figure 7:
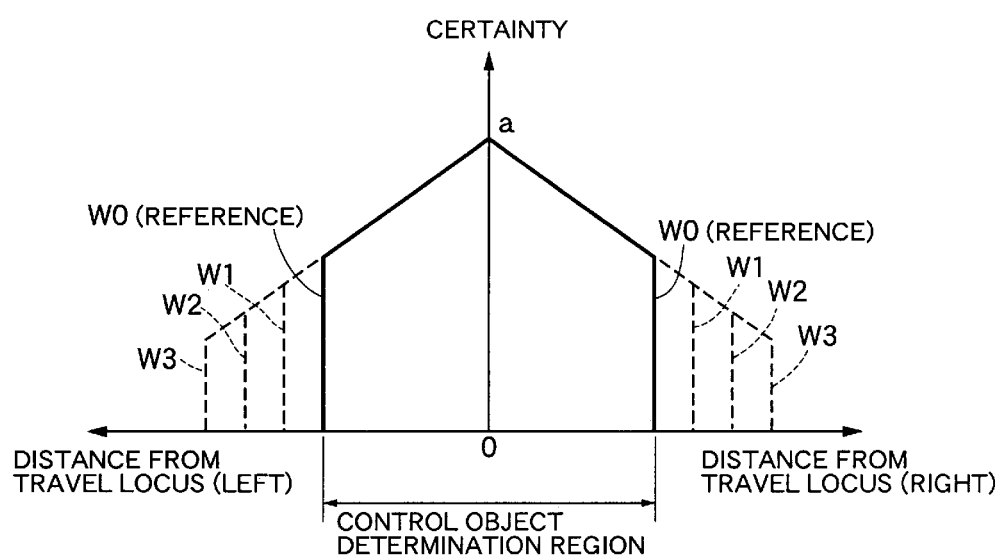
FIG. 7 is a graph related to a third embodiment showing how certainty varies according to sideways relative speed, direction-of-travel relative speed, and sideways position within a lane.

A third embodiment of the present invention is explained by reference to FIG. 7.

In the above-mentioned first and second embodiments, the certainty is changed based on the sideways relative speed A, the direction-of-travel relative speed B, or the deceleration intention P, but in the third embodiment the width of a control object determination region is changed based on a sideways relative speed A, a direction-of-travel relative speed B, or a deceleration intention P.

TABLE 5

| | B | | | |
|---|---|---|---|---|
| A | −40 km/h > B | −40 km/h ≦ B <−20 km/h | −20 km/h ≦ B <0 km/h | 0 km/h ≦ B |
| −10 km/h > A | W3 | W2 | W1 | W0 |
| −10 km/h ≦ A <−5 km/h | W2 | W2 | W1 | W0 |
| −5 km/h ≦ A <0 km/h | W1 | W1 | W1 | W0 |
| 0 km/h ≦ A | W0 | W0 | W0 | W0 |

A: sideways relative speed (a direction approaching the travel locus is negative)
B: direction-of-travel relative speed (a direction approaching the subject vehicle is negative)

TABLE 4

| | P | | | |
|---|---|---|---|---|
| A | Large deceleration intention | Medium deceleration intention | Small deceleration intention | No deceleration intention |
| −10 km/h > A | W3 | W2 | W1 | W0 |
| −10 km/h ≦ A <−5 km/h | W2 | W2 | W1 | W0 |
| −5 km/h ≦ A <0 km/h | W1 | W1 | W1 | W0 |
| 0 km/h ≦ A | W0 | W0 | W0 | W0 |

A: sideways relative speed (a direction approaching the travel locus is negative)
P: driver's deceleration intention The map of Table 5 is for looking up lines W0 to W3 based on the sideways relative speed A and the direction-of-travel relative speed B, and the map of Table 6 is for looking up lines W0 to W3 based on the sideways relative speed A and the driver's deceleration intention P. As is clear from FIG. 7, both cases are set so that, as the sideways relative speed A, the direction-of-travel relative speed B, or the deceleration intention P increases, the width of the control object determination region changes so as to increase. Therefore, a certainty is also given to an object detected at a position separated from the future travel locus of the subject vehicle in the right-and-left direction, and the possibility of the object being determined as a control object increases.

In this way, by monitoring the sideways relative speed A, the direction-of-travel relative speed B of the detected object, or the driver's deceleration intention P so as to change the width of the control object determination region, it is possible to reliably determine as a control object a preceding vehicle that cuts in in front of the subject vehicle, thereby appropriately carrying out inter-vehicle distance control, etc. with respect to the control object.

By employing control of the width of the control object determination region in the third embodiment in combination with control of the degree of certainty in the first and second embodiments, the certainty of the detected object can be calculated with higher accuracy.

Although embodiments of the present invention have been described above, the present invention can be modified in a variety of ways without departing from the subject matter thereof.

For example, in the embodiments, a direction perpendicular to the direction of travel of the subject vehicle is defined as a direction for which the sideways relative speed is calculated, but a direction perpendicular to the future travel locus of the subject vehicle may be defined as a direction for which a sideways relative speed is calculated.

Furthermore, in the embodiments the ACC system is explained, but the present invention is not limited to the ACC system and is applicable to a vehicular control object determination system for any purpose.

The invention claimed is:

1. A vehicular control object determination system comprising:
    an object detector for detecting an object that is present in the direction of travel of a vehicle;
    a travel locus estimator for estimating a future travel locus of the vehicle;
    a certainty calculator for calculating, based on a detection result obtained by the object detector, a travel locus estimated by the travel locus estimator, and predetermined certainty calculation conditions, a certainty with which the object becomes a control object;
    a control object determiner for determining the object, as a control object for a subject vehicle, according to a cumulative value of the certainty;
    a sideways relative speed detector for detecting a sideways relative speed (A) at which the object detected by the object detector approaches the travel locus of the subject vehicle; and
    a direction-of-travel relative speed detector for detecting a direction-of-travel relative speed (B) at which the object approaches the subject vehicle;
    the certainty calculator modifying the certainty calculation conditions based on the sideways relative speed (A) and the direction-of-travel relative speed (B).

2. The vehicular control object determination system according to claim 1, wherein the certainty calculator modifies the certainty calculation conditions so as to increase the certainty when the sideways relative speed (A) is equal to or greater than a predetermined value.

3. The vehicular control object determination system according to claim 1, wherein the certainty calculator modifies the certainty calculation conditions so as to increase the certainty when the direction-of-travel relative speed (B) is equal to or greater than a predetermined value.

4. The vehicular control object determination system according to claim 1, wherein the travel locus estimator sets a control object determination region having a predetermined width with respect to the estimated travel locus and modifies the width of the control object determination region according to the magnitude of at least one of the sideways relative speed (A), the direction-of-travel relative speed (B), and a deceleration intention (P), and wherein the certainty calculator calculates the certainty of the object that is present within the control object determination region.

5. The vehicular control object determination system according to claim 1, wherein the certainty calculator calculates a sideways distance between the object and the travel locus estimated by the travel locus estimator, and calculates the certainty by subtracting from a predetermined initial value a value obtained by multiplying the sideways distance by a proportionality constant.

6. The vehicular control object determination system according to claim 1, wherein the certainty calculator carries out a map lookup for a certainty based on at least one of the sideways relative speed (A), the direction-of-travel relative speed (B), and a deceleration intention (P).

7. A vehicular control object determination system comprising:
    an object detector for detecting an object that is present in the direction of travel of a vehicle;
    a travel locus estimator for estimating a future travel locus of the vehicle;
    a certainty calculator for calculating, based on a detection result obtained by the object detector, a travel locus estimated by the travel locus estimator, and predetermined certainty calculation conditions, a certainty with which the object becomes a control object;
    a control object determiner for determining the object, as a control object for a subject vehicle, according to a cumulative value of the certainty;
    a sideways relative speed detector for detecting a sideways relative speed (A) at which the object detected by the object detector approaches the travel locus of the subject vehicle; and
    a deceleration intention detector for detecting a driver's deceleration intention (P);
    the certainty calculator modifying the certainty calculation conditions based on the sideways relative speed (A) and the deceleration intention (P).

8. The vehicular control object determination system according to claim 7, wherein the certainty calculator modifies the certainty calculation conditions so as to increase the certainty when the sideways relative speed (A) is equal to or greater than a predetermined value.

9. The vehicular control object determination system according to claim 7, wherein the certainty calculator modifies the certainty calculation conditions so as to increase the certainty when the magnitude of the deceleration intention (P) is equal to or greater than a predetermined value.

10. The vehicular control object determination system according to claim 7, wherein the travel locus estimator sets a control object determination region having a predetermined width with respect to the estimated travel locus and modifies the width of the control object determination region according to the magnitude of at least one of the sideways relative speed (A), a direction-of-travel relative speed (B), and the deceleration intention (P), and wherein the certainty calculator calculates the certainty of the object that is present within the control object determination region.

11. The vehicular control object determination system according to claim 10, wherein the travel locus estimator enlarges the width of the control object determination region in response to an increase in at least one of the sideways relative speed (A), the direction-of-travel relative speed (B), and the deceleration intention (P).

12. The vehicular control object determination system according to claim 11, wherein the certainty calculator calculates a sideways distance between the object and the travel locus estimated by the travel locus estimator, and calculates the certainty by subtracting from a predetermined initial value a value obtained by multiplying the sideways distance by a proportionality constant.

13. The vehicular control object determination system according to claim 12, wherein the certainty calculator decreases the proportionality constant in response to an increase in at least one of the sideways relative speed (A), the direction-of-travel relative speed (B), and the deceleration intention (P).

14. The vehicular control object determination system according to claim 12, wherein the certainty calculator increases the certainty evenly over the whole region in the width direction of the control object determination region in response to an increase in at least one of the sideways relative speed (A), the direction-of-travel relative speed (B), and the deceleration intention (P).

15. The vehicular control object determination system according to claim 14, wherein the certainty calculator carries out a map lookup for the certainty based on at least one of the sideways relative speed (A), the direction-of-travel relative speed (B), and the deceleration intention (P).

16. A method for determining a vehicular control object comprising:
  detecting an object that is present in the direction of travel of a vehicle;
  estimating a future travel locus of the vehicle;
  calculating, based on the detection result, the estimates travel locus, and predetermined certainty calculation conditions, a certainty with which the object becomes a control object;
  determining the object, as a control object for a subject vehicle, according to a cumulative value of the certainty;
  detecting a sideways relative speed (A) at which the detected object approaches the travel locus of the subject vehicle;
  detecting a direction-of-travel relative speed (B) at which the object approaches the subject vehicle; and
  modifying the certainty calculation conditions based on the sideways relative speed (A) and the direction-of-travel relative speed (B).

17. The method according to claim 16, further comprising modifying the certainty calculation conditions so as to increase the certainty when the sideways relative speed (A) is equal to or greater than a predetermined value.

18. The method according to claim 16, further comprising modifying the certainty calculation conditions so as to increase the certainty when the direction-of-travel relative speed (B) is equal to or greater than a predetermined value.

19. The method according to claim 16, further comprising setting a control object determination region having a predetermined width with respect to the estimated travel locus and modifying the width of the control object determination region according to the magnitude of at least one of the sideways relative speed (A), the direction-of-travel relative speed (B), and a deceleration intention (P), and calculating the certainty of the object that is present within the control object determination region.

20. The method according to claim 16, further comprising calculating a sideways distance between the object and the estimated travel locus, and calculating the certainty by subtracting from a predetermined initial value a value obtained by multiplying the sideways distance by a proportionality constant.

21. The method according to claim 16, further comprising carrying out a map lookup for the certainty based on at least one of the sideways relative speed (A), the direction-of-travel relative speed (B), and a deceleration intention (P).

* * * * *